United States Patent [19]

McQuivey

[11] 3,852,527
[45] Dec. 3, 1974

[54] ARTICULATE INSPECTION INSTRUMENT

[75] Inventor: Richard M. McQuivey, Brigham City, Utah

[73] Assignee: Thiokol Corporation, Bristol, Pa.

[22] Filed: Oct. 9, 1973

[21] Appl. No.: 404,553

[52] U.S. Cl........ 178/7.1, 178/DIG. 1, 178/DIG. 30, 354/63, 356/241
[51] Int. Cl. .......................................... H04n 7/18
[58] Field of Search............... 178/DIG. 1, 7.81, 7.2, 178/DIG. 30, 7.1; 350/11; 356/237, 241; 354/63; 73/167

[56] References Cited
UNITED STATES PATENTS

| | | | |
|---|---|---|---|
| 3,329,059 | 7/1967 | McCormac | 356/241 |
| 3,399,614 | 6/1965 | Fischer | 178/7.81 |
| 3,609,236 | 9/1971 | Hellman | 178/DIG. 1 |
| 3,689,695 | 9/1972 | Rosenfield | 178/7.81 |
| 3,764,736 | 10/1973 | Kosky | 178/DIG. 1 |

Primary Examiner—Howard W. Britton
Assistant Examiner—Michael A. Masinick
Attorney, Agent, or Firm—Edward E. McCullough

[57] ABSTRACT

A tapered pedestal holds an arm having a pluraity of rigid segments hinged together, relative positions of the segments being controlled by flexible shafts that operate lead screws. Each lead screw spans a hinge by passing through a threaded pivot on each adjacent arm segment. Two long bands of spring material, biased to form tubes, are stored flat by being wound about two spindles in the pedestal. The bands extend upwardly between and around pairs of rollers in the pedestal and in the articulate arm that maintain flatness of the bands. They are threaded through an orifice at the upper end of the articulate arm and are fastened to a base that holds an observation means. As the bands emerge from the orifice, they are free to form concentric tubes that provide a rigid, extensible boom whereby the observation means may be extended and retracted in the bore to be inspected.

9 Claims, 4 Drawing Figures

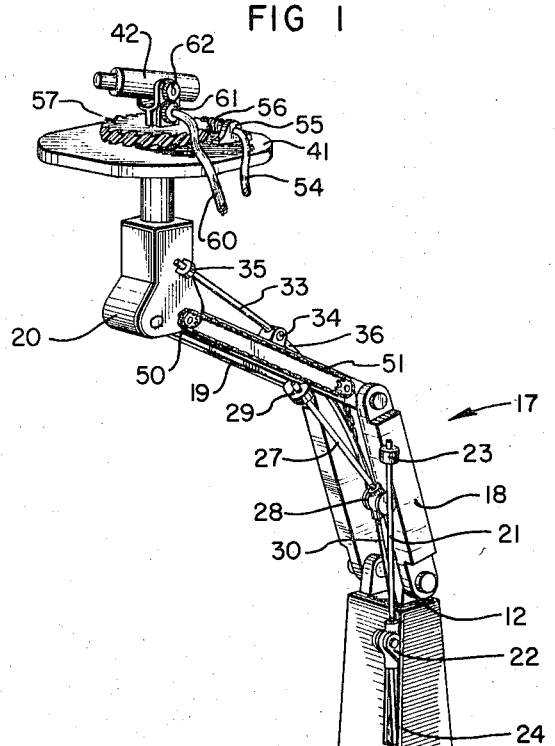
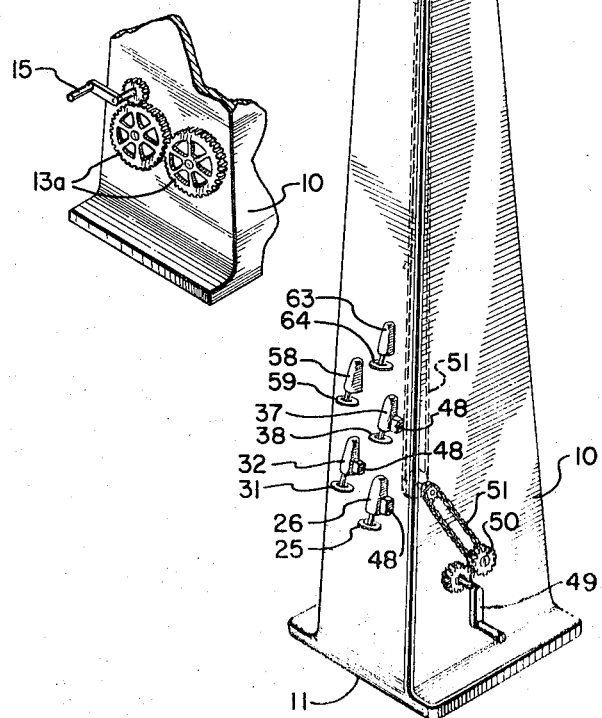

ARTICULATE INSPECTION INSTRUMENT

BACKGROUND OF THE INVENTION

This invention relates broadly to inspection devices, and more specifically to those that must be extensible in one direction to many times their stored lengths for inspecting elongated cavities. The invention herein described was made in the course of or under contract AF04(694)–926 with the U.S. Air Force.

Sometimes it is necessary to inspect an elongated cavity wherein the inspection instrument must be very compact and extensible to many times its stored length. An example of such a cavity is the central bore in the propellant of a typical solid propellant rocket. When experimental propellant is used in such a rocket, it must be inspected periodically to assure that undesirable effects, such as cracking, have not occurred as a result of aging. Such an effect must be known, because greatly increased burning surface in the cracks can cause the rocket to overpressurize and possibly explode when ignited.

Inspection of such a rocket motor is especially difficult if it has a plurality of thrust nozzles. As shown in FIG. 3, any inspection device supported outside such a rocket must execute two substantially 90° turns in order to enter the main cavity.

SUMMARY OF THE INVENTION

The present invention, which satisfies this need is an inspection instrument, the primary element of which is a pair of long bands that are spring-biased to form concentric tubes when freed. These bands are storable by being wound upon adjacent spindles that are journaled in a tapered pedestal. The spindles are connected together by gears so that a hand crank operating one will also operate the other in counter-rotation. The bands are threaded upwardly in the pedestal, supported and maintained flat by pairs of rollers. The top of the pedestal is hinged to an articulate arm, segments of which are hinged together. The free end of the articulate arm is hinged to an orifice member through which the bands are also threaded, the ends of the bands being fixed to a base that holds an observing means. The segments of the articulate arm are positioned as desired by lead screws spanning adjacent segments of the arm through threaded pivots. The lead screws are operated by long, flexible shafts that terminate in hand wheels held in the pedestal. Turnbuckles are an obvious variation of the lead screws.

Objects of the invention are to provide an inspection instrument that can negotiate complex turns and erect a rigid boom that is extensible to many times its stored length; and to provide such an instrument wherein the observation means may be controlled and oriented with precision so that any predetermined portion of the bore to be inspected may be observed.

Other objects and features of the invention will become apparent as the following detailed description is read with reference to the accompanying drawings. The same parts are designated by identical numbers through this disclosure.

DESCRIPTION OF THE DRAWINGS

FIG. 1 is a perspective view of the invention;
FIG. 2 is a partial perspective view of the hidden side of the pedestal, as it appears in FIG. 1.

DESCRIPTION OF THE PREFERRED EMBODIMENTS

Figure 3:
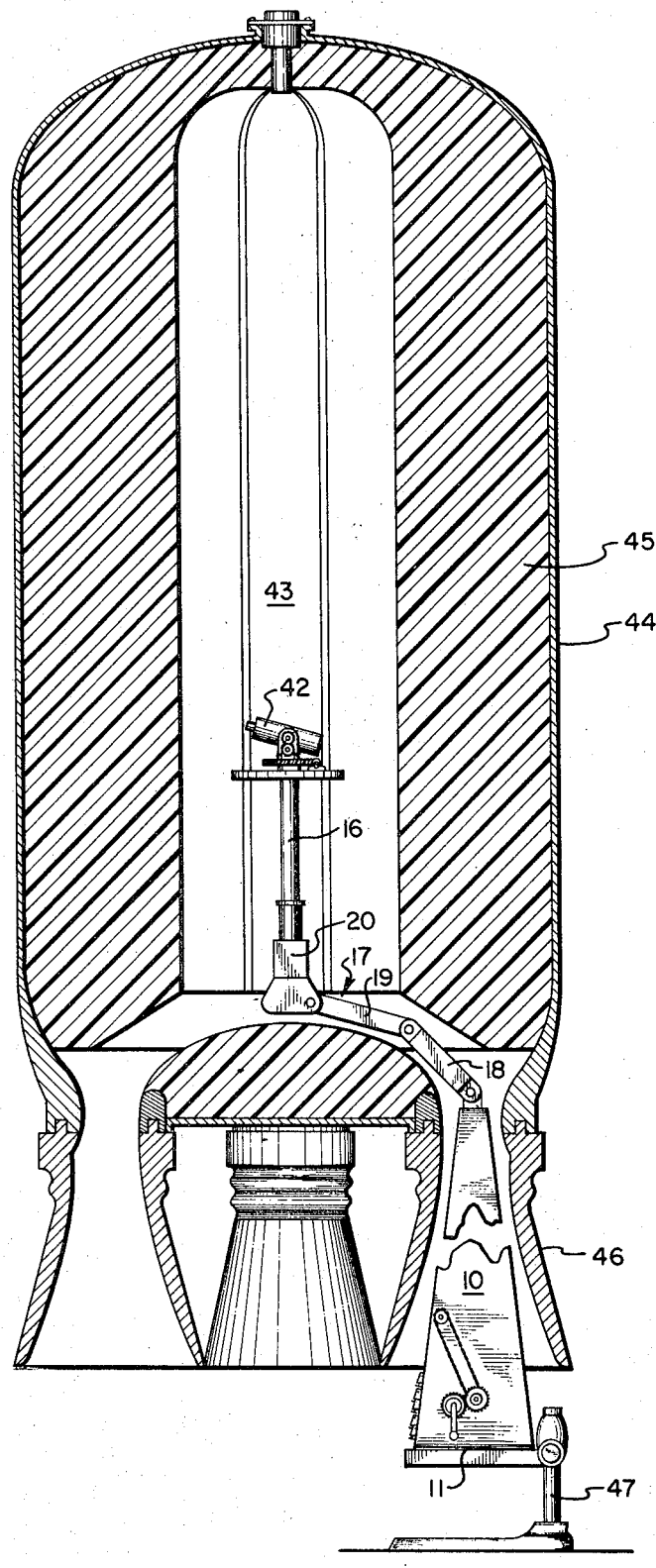
FIG. 3 is an outline drawing showing the invention installed in a rocket motor.
Figure 4:
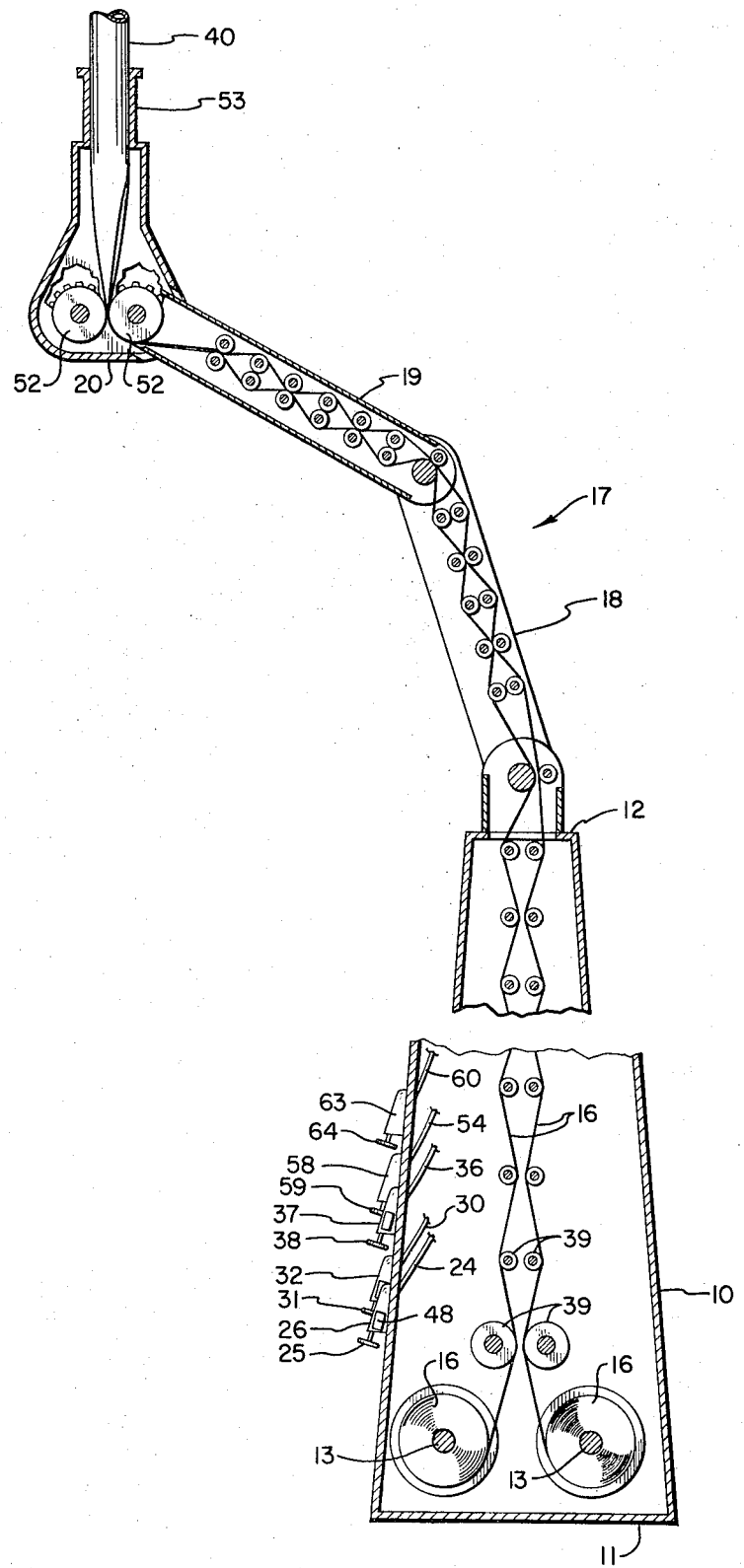
FIG. 4 is an enlarged side elevation of the invention, partially in section, with the observing means omitted.

A pedestal 10 is tapered from its base 11 to its top portion 12, and a pair of spindles 13 are journaled in bearings in the sides of the pedestal 10. The spindles 13 are also connected by gears 13a meshed so that, when one spindle is rotated, the other will be rotated in a counterdirection. For this purpose, one of the spindles 13 is equipped with a hand crank 15. A long band 16 is wound upon each of the spindles 13 for storage. Each of these bands 16 is spring-biased to form a tube.

An articulate arm 17 having two hinged segments 18 and 19 is hinged at one end to the top 12 of the pedestal 10 and at the opposite end to the orifice member 20. A first lead screw 21 is attached to the top portion of the pedestal 10 by a threaded pivot 22 and to the first segment 18 of the articulate arm 17 by a second threaded pivot 23. The lower end of the lead screw 21 is attached to a flexible shaft 24 that is threaded downwardly through the pedestal 10 and fixed to a first hand wheel 25 held to the pedestal 10 by a boss 26. By rotating the hand wheel 25, the lead screw 21 can position the arm segment 18 precisely as desired, relative to the pedestal 10, in the manner of a muscle spanning a skeletal joint.

In the same manner, the first and second segments 18 and 19 of the articulate arm 17 are controlled by a second lead screw 27 attached to the segments respectively by threaded pivots 28 and 29, its lower end being attached to a second flexible shaft 30 that is in turn attached to a second hand wheel 31 held to the pedestal by a second boss 32.

In identical fashion, a third lead screw 33 is attached to the second segment 19 of the articulate arm 17 and to the orifice member 20 by threaded pivots 34 and 35. The lower end of the lead screw 33 is attached to a third flexible shaft 36 held to the pedestal by a third boss 37 and terminates in a third hand wheel 38.

The two bands 16 are threaded upwardly through the pedestal 10, the articulate arm 17, and the orifice member 20 by pairs of idle rollers 39. The bands 16 are alternately passed between pairs of rollers 39 and around them to maintain their flatness and flexibility until they are released through the top portion of the orifice member 20, whereupon they become concentric tubes that form a rigid boom 40. The upper end of the boom 40 is fixed to a platform 41 that holds a television camera 42 or other means of observing the interior of the bore 43 of the rocket motor 44.

The invention is particularly applicable to inspection of the bore 43 of a solid propellant rocket 44, of the type shown in the FIG. 3, having a solid propellant grain 45 and a plurality of thrust nozzles 46.

Before use, the articulate arm 17 and orifice member 20 are programmed so that when the pedestal 10 is in position relative to one of the nozzles 46, the motions of the segments 18 and 19 and orifice member 20 are such that they execute a smooth 90° curve that positions the orifice member 20 precisely on the axis of the bore 43 without damage to any of the rocket parts. This is accomplished by counting the number of turns through which each hand wheel 25, 31, and 38 must be rotated to place the articulate arm 17 in the appropriate position in the rocket motor 44, as the pedestal 10 is slowly raised into place by an elevating mechanism 47. Each of the hand wheels 25, 31, and 38 is equipped with a digital counter 48 for this purpose.

A second hand crank 49 extends from the side of the pedestal 10 opposite that which holds the first hand crank 15. This second hand crank 49 operates a train of sprockets 50 and chains 51 that transmit the motion of the hand crank 49 to a pair of extending rollers 52 journaled in the orifice member 20. These rollers 52 are connected together by spur gears so that they move in counterrotation; and their function is to pull the bands 16 that pass between them. Hence, the hand crank 49 is the means for extending the boom 40, while the hand crank 15 operates the spindles 13 to pull downwardly on the bands 16 when the boom 40 is to be retracted. As the bands 16 are pulled by the rollers 52, they are fed into a sleeve 53 in the orifice member 20 that permits them to form concentric tubes to provide the rigid boom 40.

A fourth flexible shaft 54 passes through a pivot 55 attached to the platform 41 and is fixed at its upper end to a worm gear 56. The gear 56 meshes with a second worm gear 57 that attaches the camera 42 to the platform 41 and rotates about the axis of the boom 40. This flexible shaft 54 is also threaded downwardly through the pedestal 10 and through a boss 58 in the side of the pedestal 10. It is operated by a fourth hand wheel 59, whereby the television camera 42 may be oriented as desired in a horizontal plane. A fifth flexible shaft 60 operates a third worm gear 61 that meshes with fourth worm gear 62 attached to the camera for orienting it as desired in a vertical plane. The flexible shaft 60 also is threaded down through the articulate arm 17, the pedestal 10, and through a boss 63 in the side of the pedestal to a fifth hand wheel 64, whereby it may be operated.

Electrical conductors and controls for operating the television camera are conventional and are not shown.

When a rocket having plural nozzles is to be inspected, the articulate arm 17 is straightened into a vertical position and the invention is raised into one of the nozzles 46 on its elevating mechanism 47 until the camera 42 nearly reaches the propellant 45. Then, by serially turning the first, second, and third hand wheels 25, 31, and 38 and operating the elevating mechanism 47 according to a prescribed program, during which the digital counters 48 are used as guides, the orifice member 20 is moved into line with the cavity 43 to be inspected. The camera 42 is then extended and withdrawn by rotating the cranks 15 and 49, and it may be oriented as desired by rotating the fourth and fifth hand wheels 59 and 64. Readout is achieved by means of a conventional television receiver, not shown.

When the inspection is complete, the boom 40 is withdrawn by rotating the hand crank 15, and the articulate arm is withdrawn from the cavity by reversing the program followed to achieve its placement.

An invention has been described that advances the art of inspecting elongated cavities or bores. Although the embodiments have been shown with considerable specificity with regard to details, such details may be altered without departing from the scope of the invention as it is defined in the following claims.

The invention claimed is:

1. An instrument for inspecting elongated cavities, comprising:
   a pedestal;
   an articulate arm having a plurality of segments hinged together in series, one end segment being hinged to the pedestal;
   an orifice member hinged to the free end of the articulate arm;
   a pair of long bands of spring material, biased to form tubes, threaded upwardly through the pedestal, the articulate arm, and extending through the orifice member;
   means in the pedestal for anchoring and storing the lower end portion of the bands;
   means in the pedestal and in the articulate arm for maintaining the bands flat until they are released to form concentric tubes;
   means for extending and withdrawing the bands relative to the storage place therefor;
   means for positioning the segments of the articulate arm as desired; and
   observation means attached to the upper end of the concentric tubes formed by the bands.

2. The inspection instrument of claim 1 wherein the means for maintaining each of the bands in a flat position while in the pedestal and articulate arm is a series of pairs of rollers, the bands passing alternately between and around successive pairs of the rollers.

3. The inspection instrument of claim 1 wherein the means for anchoring and storing the lower end portion of the bands is a pair of spindles journaled in the sides of the pedestal, gears connecting the spindles so that they may move in counterrotation to one another, and a hand crank attached to one of the spindles, whereby the spindles may be rotated for withdrawing the bands for storage, each of the bands being anchored at its lower end portion to a separate one of the spindles so that it may be stored by being wound upon its spindle.

4. The instrument of claim 1 wherein the means of extending the bands comprises:
   a pair of rollers journaled in the orifice member at the orifice thereof, the bands being tightly confined between the rollers and extending through the orifice;
   gears connecting the rollers together so that they rotate in counterdirection to one another;
   a chain-and-sprocket train connected at one end to one of the rollers for rotating it; and
   a crank connected to the other end of the train for imparting motion to the rollers, whereby the bands may be moved through the orifice.

5. The inspection instrument of claim 1 wherein the means for positioning the segments of the articulate arm as desired comprises for each hinge:
   a pair of pivots, one fixed to a segment on each side of the hinge and each having a threaded eye;
   a lead screw spanning the hinge and passing through the eye of each pivot in threaded engagement;
   a flexible shaft attached at one end to an end of the lead screw and threaded downwardly through the articulate arm and pedestal; and
   means for rotating the flexible shaft.

6. The inspection instrument of claim 5 further including a counter attached to each flexible shaft for counting rotations thereof.

7. The inspection instrument of claim 1 wherein the observation device is a television camera and further includes means for orienting the camera as desired.

8. The inspection instrument of claim 7 wherein the means for orienting a television camera comprises:
- a first flexible shaft operatively attached to the camera for orienting it in a horizontal plane;
- means for rotating the first flexible shaft;
- a second flexible shaft operatively attached to the camera for rotating it in a vertical plane; and
- means for rotating the second flexible shaft.

9. An instrument for inspecting elongated cavities comprising:
- a pedestal;
- an articulate arm hinged at one end to the pedestal and having a plurality of segments hinged together;
- an orifice member hinged to the free end of the articulate arm;
- a pair of long bands, spring biased to form tubes, threaded upwardly through the pedestal, the articulate arm, and the orifice member;
- a pair of spindles journaled in the pedestal, gears connecting the spindles so that they may rotate in counterdirection to one another, each of the bands being attached to a spindle for storage thereon;
- a first crank attached to one of the spindles for rotating it;
- a series of pairs of rollers journaled in the pedestal and articulate arm for maintaining the bands flat until they emerge through the orifice member, the bands passing alternately between and around successive pairs of rollers;
- a pair of extending rollers in the upper end of the articulate arm, a chain-and-sprocket attached to one of the rollers, meshed gears connecting the rollers so that they may move in counterrotation, and a hand crank connected to the chain-and-sprocket train for rotating the rollers, whereby the bands may be extended through the orifice member by being passed between the rollers;
- means for positioning the members of the articulate arm and the orifice member as desired comprising: a lead screw spanning each hinge, a pivot on each member forming the hinge, having an internally threaded eye engaged by the lead screw, and a flexible shaft attached at one end to an end of the lead screw and means for rotating the flexible shaft attached to the other end thereof;
- a television camera mounted on the free end of the bands; and
- means for orienting and controlling the camera as desired.

* * * * *